(12) United States Patent
Nigo et al.

(10) Patent No.: US 9,647,501 B2
(45) Date of Patent: May 9, 2017

(54) INTERIOR PERMANENT MAGNET MOTOR, COMPRESSOR AND REFRIGERATION AND AIR CONDITIONING APPARATUS

(71) Applicants: Masahiro Nigo, Tokyo (JP); Kazuhiko Baba, Tokyo (JP); Kazuchika Tsuchida, Tokyo (JP)

(72) Inventors: Masahiro Nigo, Tokyo (JP); Kazuhiko Baba, Tokyo (JP); Kazuchika Tsuchida, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 112 days.

(21) Appl. No.: 14/763,899

(22) PCT Filed: Feb. 14, 2013

(86) PCT No.: PCT/JP2013/053532
§ 371 (c)(1),
(2) Date: Jul. 28, 2015

(87) PCT Pub. No.: WO2014/125599
PCT Pub. Date: Aug. 21, 2014

(65) Prior Publication Data
US 2015/0372548 A1 Dec. 24, 2015

(51) Int. Cl.
*H02K 1/27* (2006.01)
*H02K 21/16* (2006.01)
(Continued)

(52) U.S. Cl.
CPC .......... *H02K 1/2773* (2013.01); *H02K 1/146* (2013.01); *H02K 1/2766* (2013.01); *H02K 21/12* (2013.01);
(Continued)

(58) Field of Classification Search
CPC .. H02K 1/14; H02K 1/16; H02K 1/17; H02K 1/22; H02K 1/24; H02K 1/27; H02K 21/14; H02K 21/16; H02K 5/24
See application file for complete search history.

(56) References Cited

U.S. PATENT DOCUMENTS

| | | | |
|---|---|---|---|
| 6,525,442 B2 * | 2/2003 | Senoh | H02K 21/16 310/156.45 |
| 7,411,329 B2 * | 8/2008 | Murakami | H02K 21/16 310/156.38 |

(Continued)

FOREIGN PATENT DOCUMENTS

| | | |
|---|---|---|
| JP | H07-222384 A | 8/1995 |
| JP | 2001-327130 A | 11/2001 |

(Continued)

OTHER PUBLICATIONS

International Search Report of the International Searching Authority mailed May 7, 2013 for the corresponding international application No. PCT/JP2013/053532 (and English translation).

*Primary Examiner* — Tran Nguyen
(74) *Attorney, Agent, or Firm* — Posz Law Group, PLC

(57) ABSTRACT

A rotor outer peripheral surface includes first arcs and second arcs. The first arc is positioned in a magnetic pole center portion. The second arc is positioned in an inter-pole portion. The first arc bulges toward a radially outer side to a higher degree than the second arc. An air gap is varied in a manner of being increased as approaching from each of the magnetic pole center portions to the adjacent inter-pole portions. A hole defining portion of a magnet insertion hole on the radially outer side has a curvature of a third arc, and a hole defining portion of the magnet insertion hole on a radially inner side has a curvature of a fourth arc. An (Continued)

opening angle of a tooth tip portion, an opening angle of the first arc, and an opening angle of the third arc coincide with each other.

7 Claims, 11 Drawing Sheets

(51) Int. Cl.
  *H02K 1/14* (2006.01)
  *H02K 21/12* (2006.01)
  *F04C 29/00* (2006.01)
  *F04C 23/00* (2006.01)

(52) U.S. Cl.
  CPC ............ *H02K 21/16* (2013.01); *F04C 23/008* (2013.01); *F04C 29/0085* (2013.01); *H02K 2213/03* (2013.01)

(56) References Cited

U.S. PATENT DOCUMENTS

| | | | |
|---|---|---|---|
| 7,808,143 B2* | 10/2010 | Lee | H02K 1/2766 310/156.45 |
| 7,843,101 B2* | 11/2010 | Ito | H02K 1/2766 310/156.46 |
| 7,906,882 B2* | 3/2011 | Okuma | H02K 1/276 310/156.53 |
| 2002/0047429 A1* | 4/2002 | Kadoya | B60K 6/26 310/156.39 |
| 2002/0047434 A1* | 4/2002 | Koharagi | H02K 1/2766 310/156.56 |
| 2007/0126305 A1* | 6/2007 | Okuma | H02K 1/276 310/156.53 |
| 2008/0253897 A1 | 10/2008 | Yamamoto et al. | |
| 2010/0001607 A1* | 1/2010 | Okuma | H02K 1/276 310/156.53 |

FOREIGN PATENT DOCUMENTS

| | | |
|---|---|---|
| JP | 2003-284275 A | 10/2003 |
| JP | 3852930 B2 | 9/2006 |
| JP | 3913205 B2 | 2/2007 |
| JP | 4452488 B2 | 2/2010 |
| JP | 2012-016244 A | 1/2012 |

\* cited by examiner

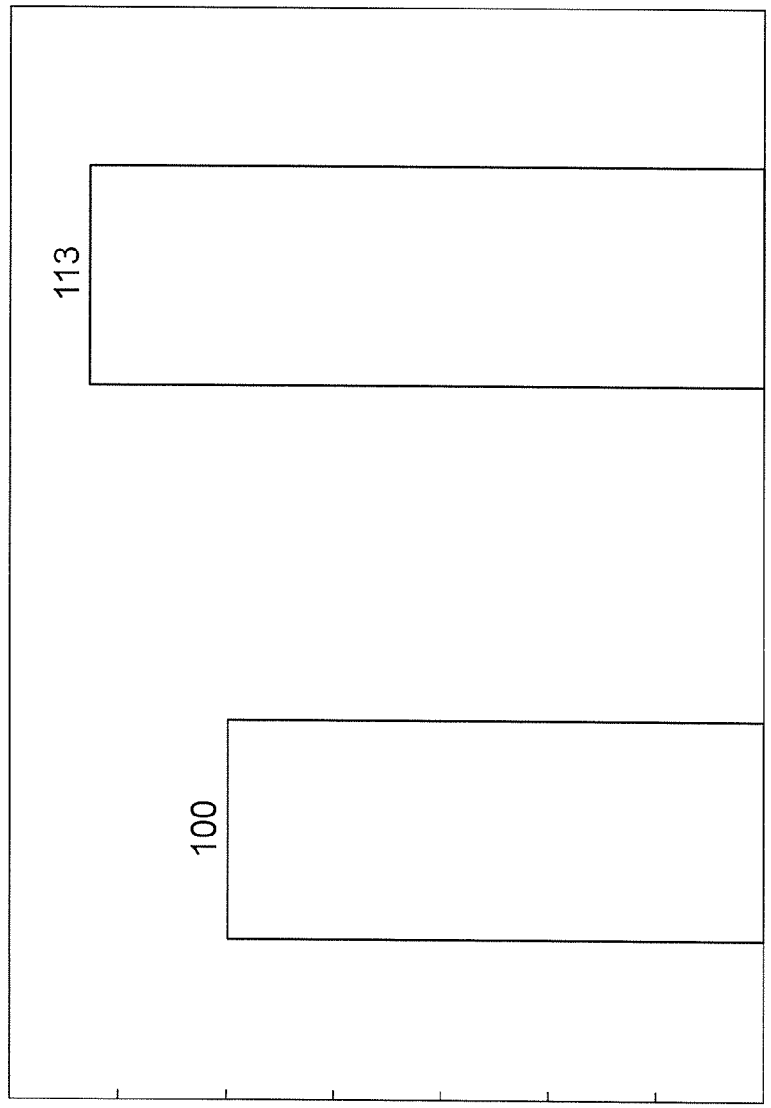

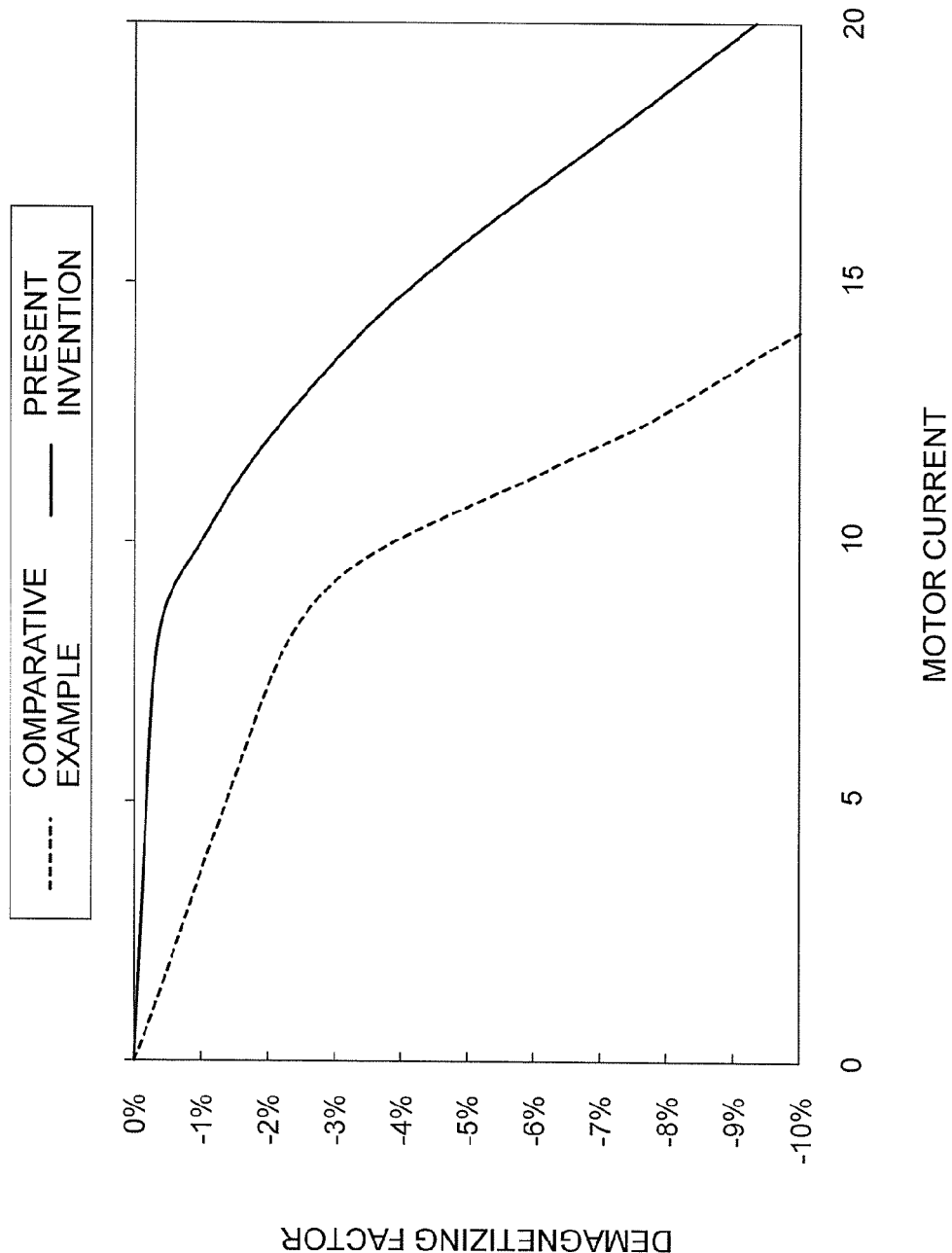

INTERIOR PERMANENT MAGNET MOTOR, COMPRESSOR AND REFRIGERATION AND AIR CONDITIONING APPARATUS

CROSS REFERENCE TO RELATED APPLICATION

This application is a U.S. national stage application of PCT/JP2013/053532 filed on Feb. 14, 2013, the content of which is incorporated herein by reference.

TECHNICAL FIELD

The present invention relates to an interior permanent magnet motor, a compressor, and a refrigeration and air conditioning apparatus.

BACKGROUND ART

In a case of a motor including a rotor in which arc-shaped permanent magnets are arranged in a rotor core so that convex portion sides thereof face a center side of the rotor, with the formation of the permanent magnets into the arc shape, the surface areas thereof can be increased to increase an amount of a magnetic flux generated in each of the permanent magnets of the rotor. On the other hand, the above-mentioned motor has the following problems. A core corresponding to a magnetic-pole surface portion of the permanent magnet is large, and hence it is difficult to control a magnetic flux density on the magnetic-pole surface portion. Vibration and noise are large due to a harmonic component of a magnetic flux density distribution. A leakage magnetic flux is easily caused between the adjacent magnets. The vicinities of end portions of the magnet are easily partially demagnetized.

As the motor in which the permanent magnets are arranged as described above, the motor disclosed in Patent Literature 1 is given. In Patent Literature 1, there is disclosed a permanent magnet motor including a rotator in which a plurality of permanent magnets for magnetic poles, which have an arc shape in cross-section, are arranged in a rotator core so that each of convex portion sides thereof faces a center side of the rotator core. In the configuration, the rotator is rotatably arranged in a stator core having an approximately cylindrical shape. Further, in the above-mentioned permanent magnet motor, the size of an air gap between an outer peripheral surface of the rotator core and an inner peripheral surface of the stator core is varied in a circumferential direction. Specifically, in each of the magnetic poles, the gap is increased as approaching from a region corresponding to a center portion of the magnetic pole in the circumferential direction to a region corresponding to a portion between the magnetic poles.

Further, in Patent Literature 2, there is disclosed a motor including a stator having a plurality of slots, and a rotator being arranged so as to be opposed to the stator with an interval and having magnet receiving holes for inserting permanent magnets. Further, in the motor, an outer peripheral portion of the rotator includes first curved parts each intersecting with a d-axis of a main magnetic pole portion so that a convex portion side thereof faces an outer peripheral side, and second curved parts each intersecting with a q-axis of an auxiliary magnetic pole portion so that a convex portion side thereof faces the outer peripheral side. The first curved parts and the second curved parts are alternately connected to each other. A center of a radius of the first curved part of the main magnetic pole portion coincides with a center of a shaft hole of the rotator. A radius of the second curved part of the auxiliary magnetic pole portion is larger than the radius of the first curved part of the main magnetic pole portion. Further, assuming that, regarding the shaft hole of the rotator as a center, an opening angle of the first curved part is defined as θ1, an opening angle of the second curved part is defined as θ2, and an opening angle of a tooth end portion between the slots of the stator is defined as θ3, θ1≤θ2 and θ1≤θ3 are satisfied.

CITATION LIST

Patent Literature

[PTL 1] JP 7-222384 A
[PTL 2] JP 4452488 B2

SUMMARY OF INVENTION

Technical Problem

The related-art motor as described above is directed to construct a motor reduced in noise and vibration by improving the magnetic flux density distribution on the rotator surface. However, measures are not taken against such problems in reliability that the performance is decreased due to the leakage magnetic flux between the adjacent magnets, and that the vicinities of the end portions of the magnet are easily partially demagnetized.

The present invention has been made in view of the above, and has an object to provide a highly efficient and highly reliable interior permanent magnet motor, which hardly causes a leakage magnetic flux between adjacent magnets and enables permanent magnets to be hardly demagnetized while pursuing a better effect in noise and vibration.

Solution to Problem

In order to attain the above-mentioned object, according to one embodiment of the present invention, there is provided an interior permanent magnet motor including: a stator; and a rotor rotatably arranged so as to be opposed to the stator, in which the rotor includes a rotor core having a plurality of magnet insertion holes formed therein, into which corresponding permanent magnets are respectively inserted, in which an air gap is secured between a rotor outer peripheral surface of the rotor and a stator inner peripheral surface of the stator, in which the stator includes a plurality of tooth portions, in which a tooth tip portion having both side portions expanding in a circumferential direction is formed on a distal end portion of each of the tooth portions, in which the rotor outer peripheral surface includes, when viewed in a cross-section orthogonal to a rotation center line: a plurality of first arcs; and a plurality of second arcs, in which each of the first arcs is positioned in a corresponding magnetic pole center portion on the rotor outer peripheral surface, in which each of the second arcs is positioned in a corresponding inter-pole portion on the rotor outer peripheral surface, in which the first arc bulges toward a radially outer side to a higher degree than the second arc so that the air gap is varied in a manner of being increased as approaching from each of the magnetic pole center portions to the adjacent inter-pole portions, in which, when viewed in the cross-section orthogonal to the rotation center line, a hole defining portion of each of the magnet insertion holes of the rotor core on the radially outer side has a curvature of a third arc, and a hole defining portion of the each of the magnet insertion holes of the rotor core on a radially inner side has a curvature of a fourth arc, and in which an opening angle of the tooth tip portion, an opening angle of the first arc, and an opening angle of the third arc coincide with each other.

Advantageous Effects of Invention

According to the one embodiment of the present invention, it is possible to provide the highly efficient and highly reliable interior permanent magnet motor, which hardly causes the leakage magnetic flux between the adjacent magnets and enables the permanent magnets to be hardly demagnetized while pursuing the better effect in the noise and vibration.

BRIEF DESCRIPTION OF DRAWINGS

FIG. 10 is a graph for comparing root mean square values of inducted voltages between the comparative example and the present invention.

FIG. 11 is a graph for comparing demagnetizing factors between the comparative example and the present invention when a stator is energized so that an armature magnetic flux in a phase opposite to that of a permanent magnet of a rotor is generated.

DESCRIPTION OF EMBODIMENTS

Figure 1:
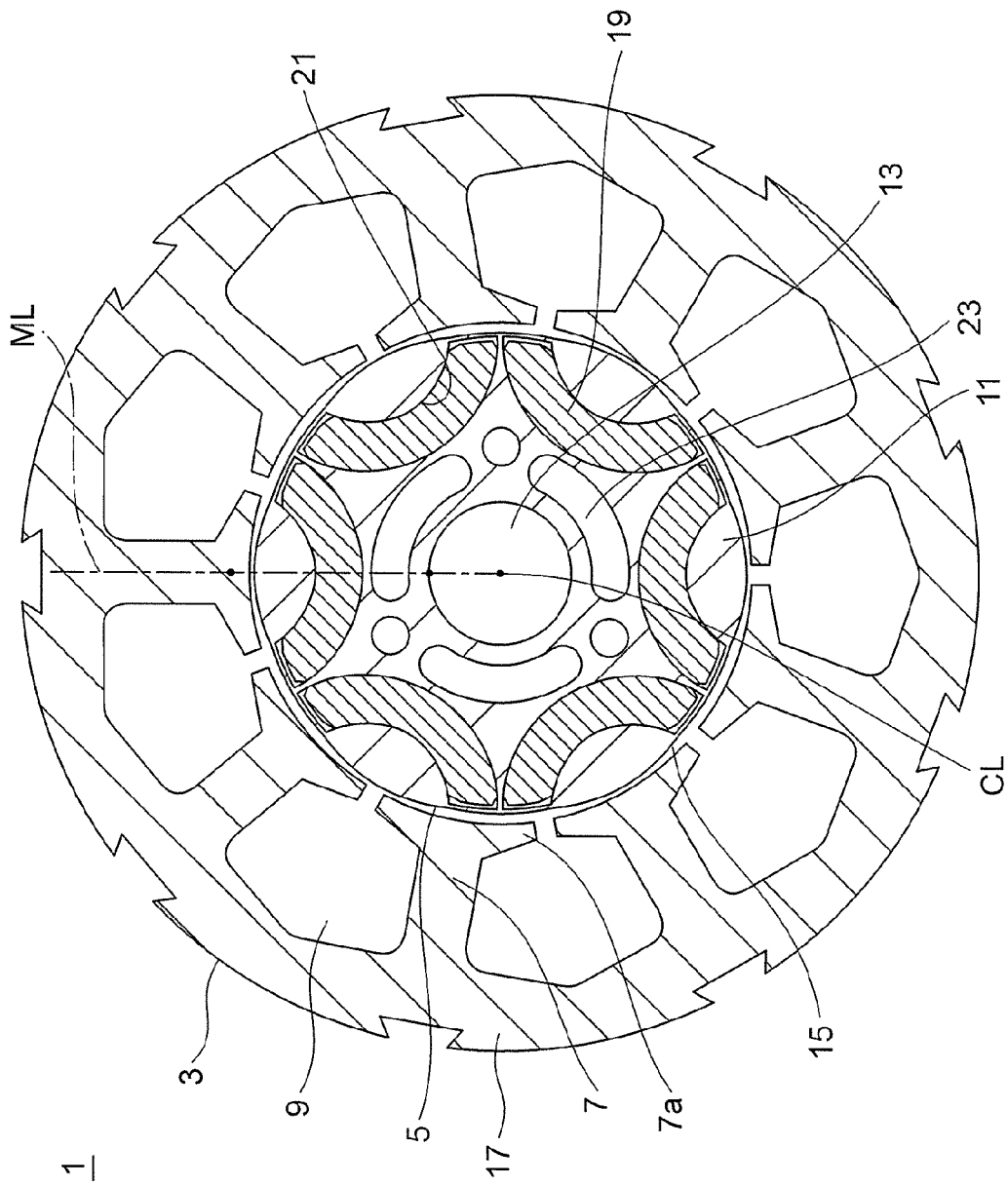
FIG. 1 is a view for illustrating a cross-section orthogonal to a rotation center line of an interior permanent magnet motor according to a first embodiment of the present invention.

Now, embodiments according to the present invention are described referring to the accompanying drawings. Note that, in the drawings, the same reference symbols represent the same or corresponding parts.

First Embodiment

FIG. 1 is a view for illustrating a cross-section orthogonal to a rotation center line of an interior permanent magnet motor according to a first embodiment of the present invention. Note that, FIG. 2 to FIG. 5 are all partially enlarged views extracting a part from an entire configuration in the illustration of FIG. 1, and for the sake of clarity of illustration, the hatching is omitted.

As illustrated in FIG. 1, an interior permanent magnetic motor 1 includes a stator 3 and a rotor 5 rotatably arranged so as to be opposed to the stator 3. The stator 3 includes a plurality of tooth portions 7. Each of the plurality of tooth portions 7 is adjacent to other tooth portions 7 through intermediation of corresponding slot portions 9. The plurality of tooth portions 7 and a plurality of the slot portions 9 are arranged alternately at equal intervals in a circumferential direction. A publicly known stator winding (not shown) is wound around each of the plurality of tooth portions 7 in a publicly known manner.

The rotor 5 includes a rotor core 11 and a shaft 13. The shaft 13 is coupled to an axial center portion of the rotor core 11 by shrink fitting, press fitting, or the like to transmit rotational energy to the rotor core 11. An air gap 15 is secured between an outer peripheral surface of the rotor 5 and an inner peripheral surface of the stator 3.

In such a configuration, the rotor 5 is held on an inner side of the stator 3 through intermediation of the air gap 15 so as to be rotatable about a rotation center line CL (rotation center of the rotor, axial line of the shaft). Specifically, a current having a frequency synchronized with an instructed number of revolutions is supplied to the stator 3 to generate a rotation magnetic field, thereby rotating the rotor 5. The air gap 15 between the stator 3 and the rotor 5 is an air gap of from 0.3 mm to 1 mm.

Next, configurations of the stator 3 and the rotor 5 are described in detail. The stator 3 includes a stator core 17. The stator core 17 is formed by punching magnetic steel plates each having a thickness of from about 0.1 mm to about 0.7 mm into a predetermined shape, and laminating a predetermined number of the magnetic steel plates while fastening the magnetic steel plates by caulking. In this case, the magnetic steel plates each having a thickness of 0.35 mm are used.

The stator core 17 has nine slot portions 9 radially formed on a radially inner side thereof at substantially equal intervals in the circumferential direction. Further, a region between the adjacent slot portions 9 in the stator core 17 is referred to as the tooth portion 7. Each of the tooth portions 7 extends in a radial direction, and protrudes toward the rotation center line CL. Further, a most part of the tooth portion 7 has a substantially constant width in the circumferential direction over a range from a radially outer side to a radially inner side. However, a distal end portion of the tooth portion 7, which is located on the radially innermost side, has a tooth tip portion 7a (mesh portion in FIG. 2). Each tooth tip portion 7a is formed into an umbrella shape with its both side portions expanding in the circumferential direction.

The stator winding (not shown) forming a coil (not shown) for generating a rotational magnetic field is wound around the tooth. The coil is formed by directly winding a magnet wire around the magnetic pole tooth through intermediation of an insulator. This winding method is referred to as a concentrated winding. The coil is connected in three-phase Y connection. The number of turns and a wire diameter of the coil are determined depending on required characteristics (number of revolutions, torque, and the like), the voltage specifications, and the sectional area of the slot. In this case, in order to facilitate the winding, separated teeth are developed in a band shape, and a magnet wire having a wire diameter φ of about 0.8 mm is wound around each of the magnetic pole teeth by about 100 turns. After the winding, the separated teeth are rounded into an annular shape and welded, to thereby form the stator.

The rotatably held shaft 13 is arranged in the vicinity of a center of the stator 3. Further, the rotor 5 is fitted onto the shaft 13. The rotor 5 includes the rotor core 11, and similarly to the stator core 17, the rotor core 11 is also formed by punching magnetic steel plates each having a thickness of from about 0.1 mm to about 0.7 mm into a predetermined shape, and laminating a predetermined number of the magnetic steel plates while fastening the magnetic steel plates by caulking. In this case, the magnetic steel plates each having a thickness of 0.35 mm are used.

A plurality of the permanent magnets 19 (six permanent magnets 19 in this specific example), which are magnetized so that the N poles and the S poles are alternately positioned, are arranged in the rotor core 11. Referring to FIG. 1, each of the permanent magnets 19 is curved into an arc shape and arranged so that a convex portion side of the arc shape faces the center side of the rotor 5. In more detail, magnet insertion holes 21 as many as the number of the plurality of permanent magnets 19 are formed in the rotor core 11. The corresponding permanent magnets 19 are inserted into a plurality of the magnet insertion holes 21, respectively. As illustrated in FIG. 1, one permanent magnet 19 is inserted into one magnet insertion hole 21. Note that, the number of magnetic poles of the rotor 5 may be any number as long as the number is two or more. The case of six poles is exemplified in this embodiment.

Note that, air holes 23 are formed in the rotor core 11 on a radially inner side of the permanent magnets 19, for allowing a coolant and an oil to pass therethrough when the interior permanent magnet motor 1 is mounted on a compressor.

Figure 2:
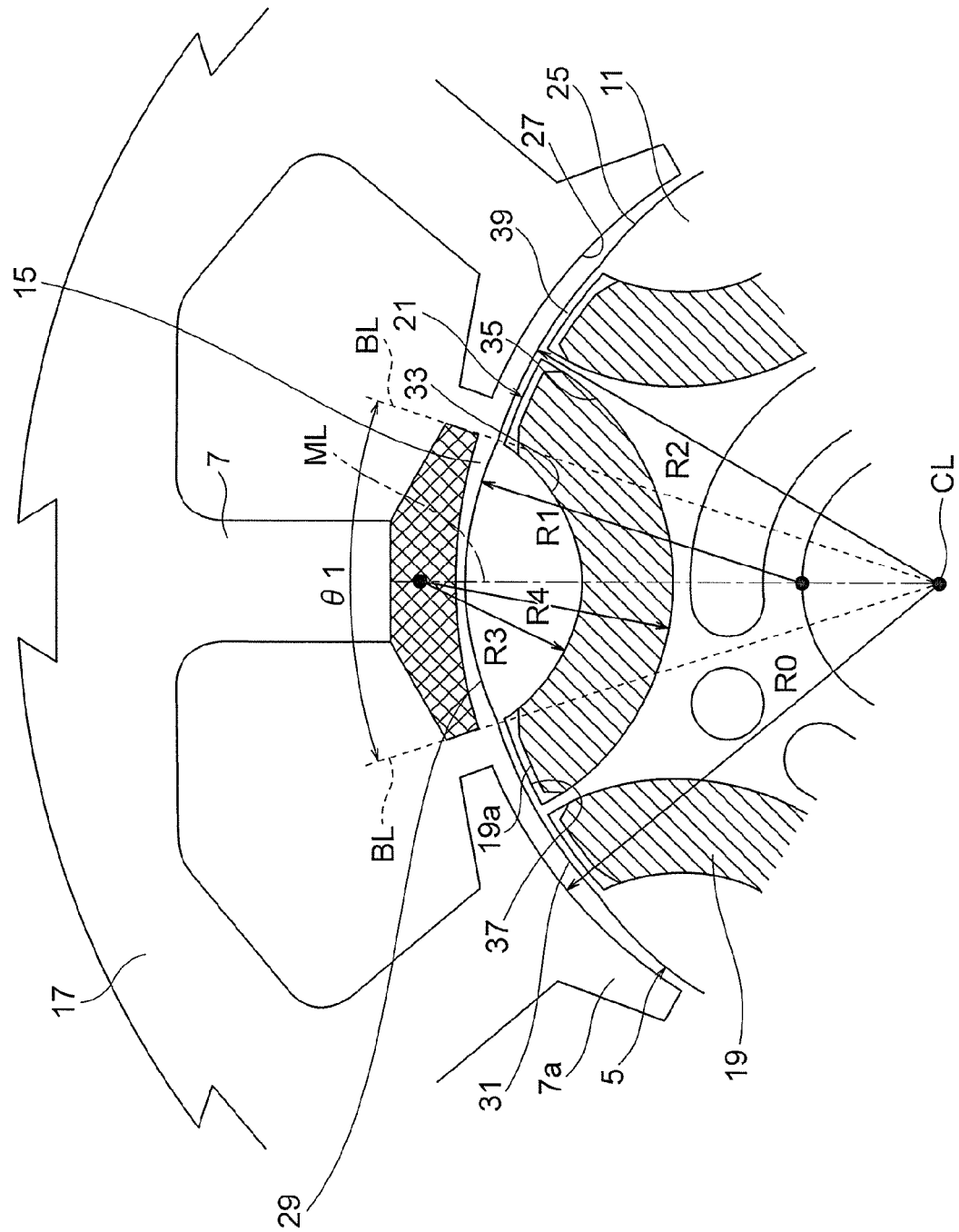
FIG. 2 is a view for illustrating a peripheral part of one permanent magnet and a peripheral part of one tooth tip portion corresponding to the one permanent magnet in FIG. 1 in an enlarged manner.

FIG. 2 is a view for illustrating a peripheral part of one permanent magnet and a peripheral part of one tooth tip portion corresponding to the one permanent magnet in FIG. 1 in an enlarged manner. As illustrated in FIG. 2, the air gap 15 between a stator inner peripheral surface 27 and a rotor outer peripheral surface 25 is varied in the circumferential direction. In the first embodiment, a radius R0 of the stator inner peripheral surface 27 from the rotation center line CL is constant. Therefore, the rotor outer peripheral surface 25 partially bulges toward the radially outer side so that the above-mentioned variation of the air gap 15 in the circumferential direction is attained.

The rotor outer peripheral surface 25 includes a plurality of first arcs 29 and a plurality of second arcs 31 when viewed in the cross-section in FIG. 2 (cross-section orthogonal to the rotation center line CL). Each of the first arcs 29 corresponds to a cross-section of a convex surface positioned on a corresponding magnetic pole center portion on the rotor outer peripheral surface 25. Each of the second arcs 31 corresponds to a cross-section of a cylindrical surface positioned on a corresponding inter-pole portion on the rotor outer peripheral surface 25. The first arcs 29 bulge toward the radially outer side to a higher degree than the second arcs 31. Each of the second arcs 31 is continuous from end portions of a corresponding pair of the first arcs 29. That is, the plurality of first arcs 29 and the plurality of second arcs 31 are alternately arrayed in the circumferential direction.

With the rotor outer peripheral surface 25 and the stator inner peripheral surface 27, which are opposed to each other as described above, the air gap 15 is varied over an entire circumference in a manner of being increased as approaching from each of the magnetic pole center portions to the adjacent inter-pole portions.

As a specific example, a minimum air gap 15 on an inter-pole center line ML among the air gaps 15 each between the first arc 29 on the rotor outer peripheral surface 25 and the stator inner peripheral surface 27 is 0.6 mm. Further, in the cross-section of FIG. 2, an air gap 15 on a boundary line BL passing through an intersection point (connection point, boundary point) between the first arc 29 and the second arc 31 is 0.9 mm. The air gap 15 between the first arc 29 and the stator inner peripheral surface 27 becomes smaller as approaching to the inter-pole center line ML in a range of the first arc 29. On the other hand, an air gap 15 between the second arc 31 and the stator inner peripheral surface 27 is uniform in a range of the second arc 31. Note that, each of the first arcs 29 and a pair of the second arcs 31 adjacent to both sides of the corresponding first arc 29 are formed to be line symmetric with respect to the inter-pole center line ML of the corresponding first arc 29.

In FIG. 2, assuming that a curvature of a hole defining portion of each of the magnet insertion holes 21 on the radially outer side (side farther from the rotation center line CL) is defined as a third arc 33, and a curvature of a hole defining portion of each of the magnet insertion holes 21 on the radially inner side (side closer to the rotation center line CL) is defined as a fourth arc 35, an opening angle θ1 of the tooth tip portion 7a, an opening angle θ1 of the first arc 29, and an opening angle θ1 of the third arc 33 coincide with each other. Note that, as a more preferred example, the above-mentioned three opening angles θ1 are designed to fall within 2°. However, effects described below can be obtained without any problem as long as the above-mentioned three opening angles fall within 5°.

When the arc-shaped permanent magnets 19 are arranged in the rotor core 11 so that the convex portion sides face the center side of the rotor 5, a portion of each of the permanent magnets 19, which is closest to the rotor outer peripheral surface 25, corresponds to a side surface portion 19a of each of the arc-shaped permanent magnets 19. When a large current flows through the stator 3 to apply an armature magnetic flux to the rotor 5, the side surface portion 19a of each of the permanent magnets 19 is most easily demagnetized.

A magnet-side surface opposing portion 37 of each of the magnet insertion holes 21, which receives the side surface portion 19a of each of the permanent magnets 19, is located within a range of an inner side of the second arc 31 on the rotor outer peripheral surface 25 in the radial direction due to the above-mentioned relationship of the opening angles θ1. Inter-pole thin portions 39 having a uniform thickness are each secured between the magnet-side surface opposing portion 37 in the rotor core 11 and the second arc 31. Those inter-pole thin portions 39 each serve as a path for a leakage magnetic flux between the adjacent magnetic poles, and hence it is preferred that the inter-pole thin portion 39 have a thickness as small as possible. In this case, the inter-pole thin portion 39 is set to 0.35 mm, which is approximately as large as the thickness of a magnetic steel plate, as the minimum width that allows press work. With such a configuration, the magnetic path in the inter-pole thin portion 39 according to the first embodiment is narrow, and with the leakage magnetic flux between the adjacent magnetic poles, a magnetic flux density is high to cause magnetic saturation.

Note that, a center of a radius R1 of the above-mentioned first arc 29 is located at a position on the inter-pole center line ML, which is displaced toward a corresponding magnetic pole side (radially outer side) from a rotor center (rotation center line CL). A center of a radius R2 of the second arc 31 and a center of the radius R0 of the stator inner peripheral surface 27 are located on the rotor center (rotation center line CL). A center of a radius R3 of the third arc 33 and a radius R4 of the fourth arc 35 are set to be positioned in the tooth tip portion 7a on the inter-pole center line ML when the magnetic pole center of the rotor 5 and the tooth of the stator 3 are opposed to each other. The center of the radius R3 of the third arc 33 as described above coincides with an orientation focal point of the permanent magnet.

According to the interior permanent magnet motor of the first embodiment, which is configured as described above, the air gap between the rotor outer peripheral surface and the stator inner peripheral surface is secured so as to be increased as approaching from the magnetic pole center portion to the inter-pole portion. Thus, the magnetic resistance of a rotor surface is increased as approaching from the magnetic pole center portion to the inter-pole portion, and hence a magnetic flux density distribution on the rotor surface corresponds to a distribution similar to a sine wave having the highest magnetic flux density at the magnetic pole center portion. Accordingly, a harmonic component of the magnetic flux density can be reduced to reduce vibration and noise of the motor.

In addition, the opening angle of the tooth tip portion, the opening angle of the first arc on the rotor outer peripheral surface, and the opening angle of the third arc of the magnet insertion hole coincide with each other. Thus, widths of magnetic paths for inflow and outflow of the magnetic flux are equal to each other, thereby being capable of causing the magnetic flux, which is generated in the permanent magnet of the rotor, to effectively flow into the stator. Moreover, a part of the rotor outer peripheral surface, which is positioned on the radially outer side with respect to the side surface portion of the permanent magnet that is easily demagnetized, is formed by the second arc. Thus, the air gap between the tooth portion and the above-mentioned part is wide to attain a configuration in which the armature magnetic flux hardly interlinks with the permanent magnet, thereby enabling the permanent magnet to be hardly demagnetized.

Further, the opening angle of the tooth tip portion and the opening angle of the first arc on the rotor outer peripheral surface are set equal to each other in order that the widths of the magnetic paths for inflow and outflow of the magnetic flux are set equal to each other. When the opening angle of the tooth tip portion is larger than the opening angle of the first arc on the rotor outer peripheral surface, a magnetic-flux inflow angle of the stator is larger than a magnetic-flux outflow angle of the rotor, thereby causing a disadvantage in that local concentration of the magnetic flux density easily occurs in the tooth tip portion. On the other hand, when the opening angle of the tooth tip portion is smaller than the opening angle of the first arc on the rotor outer peripheral surface, the magnetic-flux inflow angle of the stator is smaller than the magnetic-flux outflow angle of the rotor, thereby causing a disadvantage in that the magnetic flux of the permanent magnet is short-circuited in the rotor or leaks to the tooth tip portions of the adjacent teeth to be short-circuited thereto so that the magnetic flux cannot effectively interlink with the stator. Therefore, in the first embodiment, the opening angle of the tooth tip portion, the opening angle of the first arc on the rotor outer peripheral surface, and the opening angle of the third arc of the magnet insertion hole are set to coincide with each other. In this manner, all the above-mentioned plurality of disadvantages can be avoided while equally setting the widths of the magnetic paths for inflow and outflow of the magnetic flux.

Further, when the opening angle of the tooth tip portion and the opening angle of the first arc on the rotor outer peripheral surface are larger than the opening angle of the third arc of the magnet insertion hole, the armature magnetic flux from the stator easily interlinks with a portion on an inner side of the opening angle of the first arc on the rotor outer peripheral surface, thereby causing a disadvantage in that end portions of the permanent magnet are easily partially demagnetized when the large current is caused to flow therethrough. Further, when the opening angle of the tooth tip and the opening angle of the first arc on the rotor outer peripheral surface are smaller than the opening angle of the third arc of the magnet insertion hole, the magnetic-flux inflow angle of the stator is smaller than the angle at which the magnetic flux of the permanent magnet flows out, thereby causing a disadvantage in that the magnetic flux of the permanent magnet is short-circuited in the rotor or leaks to the tip portions of the adjacent tooth portions to be short-circuited thereto so that the magnetic flux cannot effectively interlink with the stator. In contrast, in the first embodiment, the opening angle of the tooth tip portion, the opening angle of the first arc on the rotor outer peripheral surface, and the opening angle of the third arc of the magnet insertion hole are set to coincide with each other. In this manner, all the above-mentioned plurality of disadvantages can be avoided.

Further, as a relationship between the arcs for causing the magnetic flux density distribution on the rotor surface to approach the sine wave while increasing the surface area of the permanent magnet, it is preferred that the relationship of $R1>2\times(R3)$ be established between the radius R1 of the first arc on the rotor outer peripheral surface and the radius R3 of the third arc of the magnet insertion hole. In the first embodiment, the center of the radius R1 of the first arc is set to a position displaced toward the magnetic pole side from the rotor center (rotation center line CL), and the center of the radius R3 of the third arc is set in the tooth tip portion. In this manner, the above-mentioned relationship of $R1>2\times(R3)$ is satisfied. With this, the magnetic flux from the permanent magnet, which interlinks with the tooth portion, can be caused to easily concentrate on the tooth tip portion on a magnetic pole center axis. Thus, an amount of the magnetic flux that effectively interlinks with the stator can be increased, and a magnetic flux density distribution on a magnetic pole surface also approaches a sine wave distribution that is convex at the magnetic pole center. Accordingly, in conjunction with the effect in the magnetic resistance distribution on the first arc on the rotor surface, the magnetic flux density distribution on the rotor surface can further approach the sine wave.

As described above, according to the first embodiment, it is possible to obtain a highly efficient and highly reliable interior permanent magnet motor, which hardly causes the leakage magnetic flux between the adjacent magnets and enables the permanent magnets to be hardly demagnetized while pursuing a better effect in noise and vibration.

Second Embodiment

Figure 3:
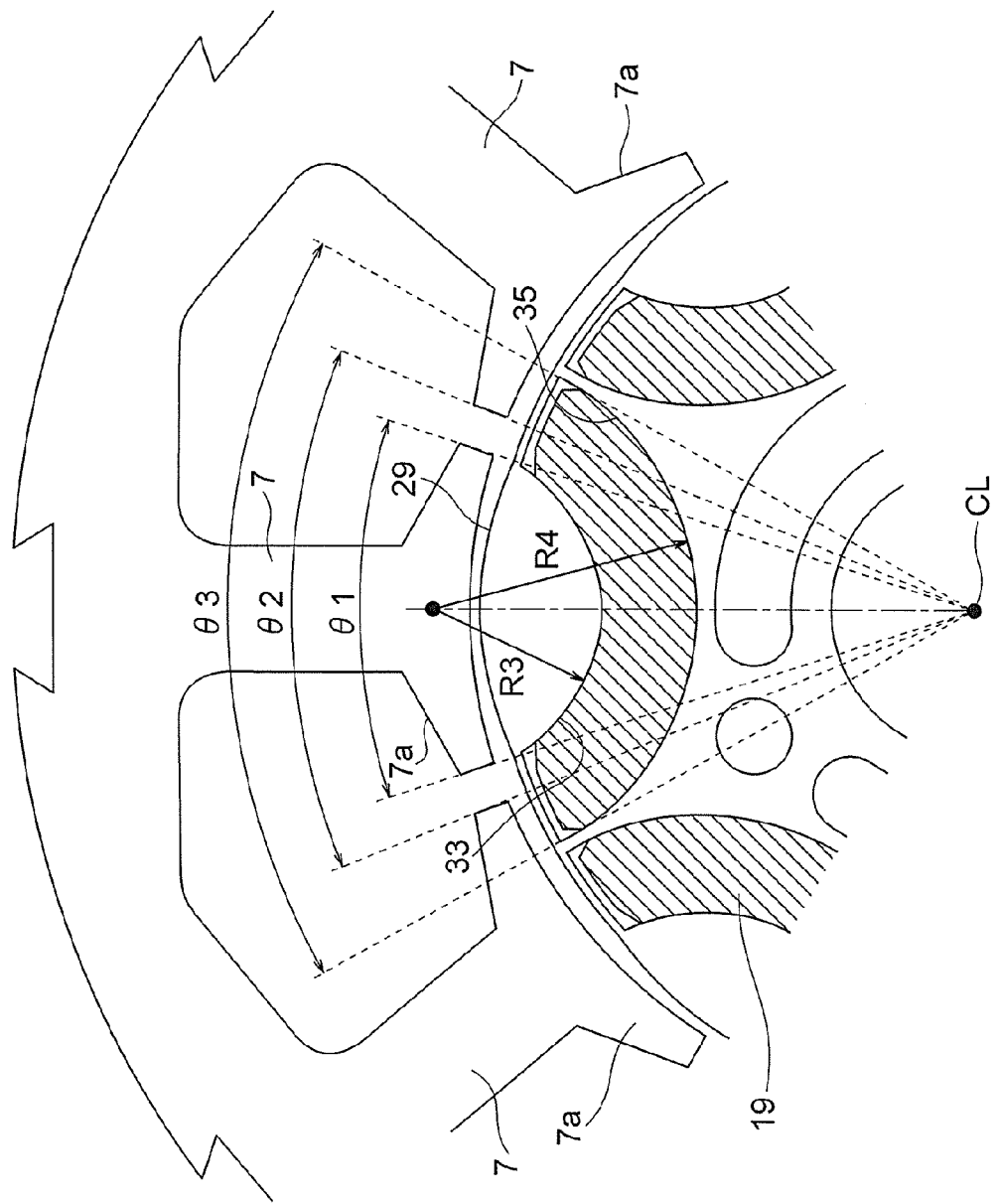
FIG. 3 is a view according to a second embodiment of the present invention in the same manner as that of FIG. 2.

Next, a second embodiment of the present invention is described referring to FIG. 3. FIG. 3 is a view according to the second embodiment of the present invention in the same manner as that of FIG. 2. Note that, the second embodiment has the same configuration as that of the above-mentioned first embodiment except for portions described below.

An interior permanent magnet motor according to the second embodiment is configured such that an opening angle θ2 between the tooth tip portions 7a of a pair of tooth portions 7, which are formed on both sides of one tooth portion 7, is smaller than an opening angle θ3 of the fourth arc 35 of the magnet insertion hole 21.

With such a configuration, according to the second embodiment, the following advantages can also be obtained in addition to the advantages in the above-mentioned first embodiment. That is, in the second embodiment, in a phase in which the tooth portion and the magnetic pole center of the rotor are opposed to each other and the permanent magnet is most easily demagnetized, when the armature magnetic flux from the tooth portion flows into the rotor, a state in which all the permanent magnets are embedded in the rotor surface is achieved in regions of an angle range of an inner side of the opening angle θ2 and an angle range of an outer side of the opening angle θ1, thereby causing a high magnetic resistance. Therefore, the armature magnetic flux that flows from the tooth portion into the rotor is easily short-circuited to the adjacent tooth tips having a low magnetic resistance and being located at a short distance from the tooth portion rather than interlinking with the permanent magnet. Accordingly, the armature magnetic flux hardly interlinks with the permanent magnet. Therefore, even when a large current flows through the stator, less demagnetization of the permanent magnet is enabled.

Third Embodiment

Figure 4:
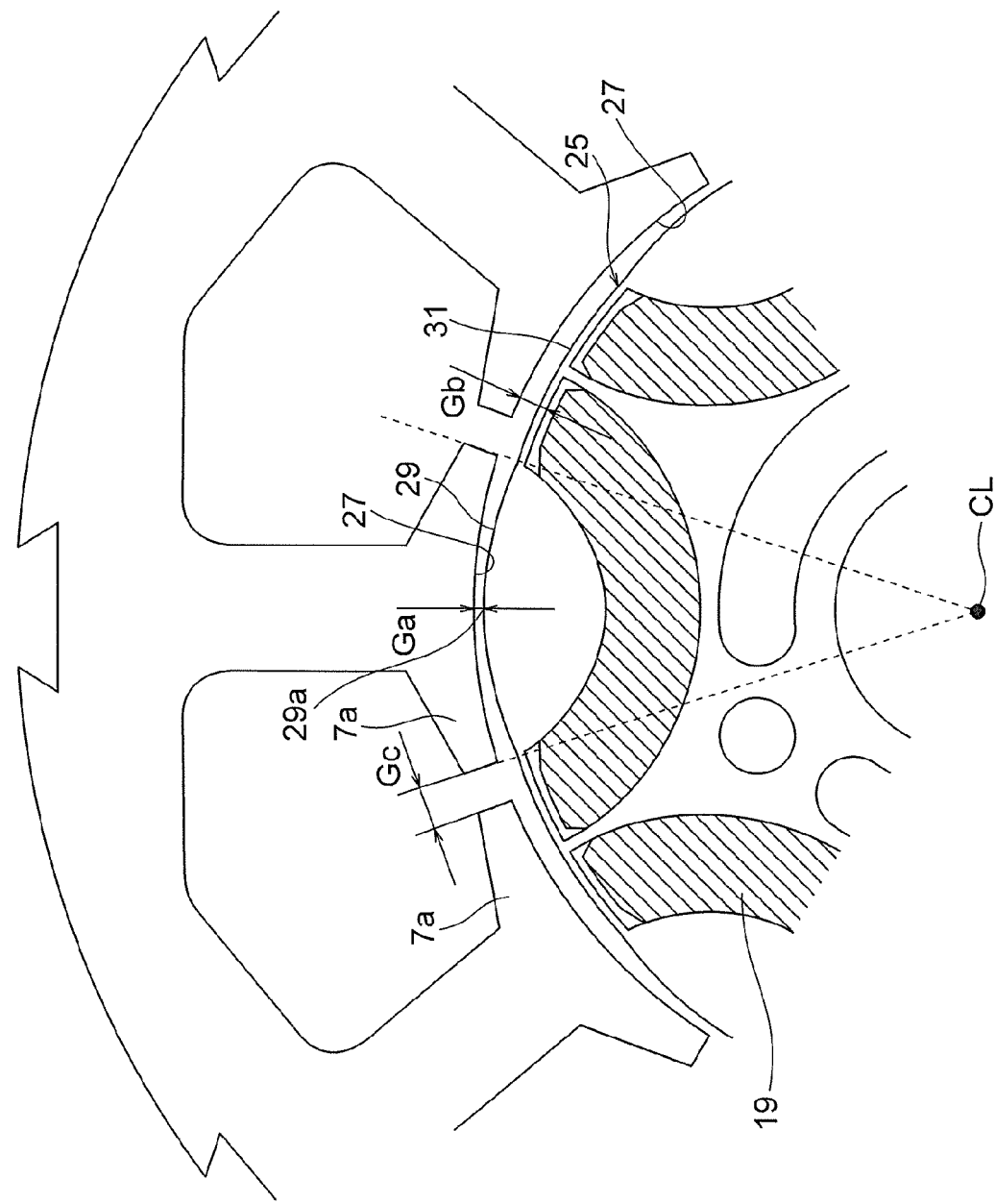
FIG. 4 is a view according to a third embodiment of the present invention in the same manner as that of FIG. 2.

Next, a third embodiment of the present invention is described referring to FIG. 4. FIG. 4 is a view according to the third embodiment in the same manner as that of FIG. 2. Note that, the third embodiment has the same configuration as that of the above-mentioned second embodiment except for portions described below.

An interior permanent magnet motor according to the third embodiment is configured such that, assuming that the narrowest interval of the air gap 15 between a magnetic pole center portion 29a on the first arc 29 on the rotor outer peripheral surface 25 and the stator inner peripheral surface 27 of the tooth tip portion 7a is defined as Ga, a dimension obtained by further adding the thickness of the inter-pole thin portion 39 to the widest interval of the air gap 15 between the second arc 31 on the rotor outer peripheral surface 25 and the stator inner peripheral surface 27 of the tooth tip portion 7a is defined as Gb, and an interval of the adjacent tooth tip portions 7a is defined as Gc, a magnitude relationship of $2\times(Ga)<(Gc)<2\times(Gb)$ is satisfied.

Note that, the inter-pole thin portion 39 serves as the path for the leakage magnetic flux between the adjacent magnetic poles, and hence it is preferred that the inter-pole thin portion 39 be secured as narrow as possible. In this case, the inter-pole thin portion 39 is set to be approximately as large as the thickness of the magnetic steel plate as the minimum width that allows the press work. However, the inter-pole thin portion, which is narrow as the magnetic path as described above, also serves as a portion having the high magnetic flux density to cause the magnetic saturation due to the leakage magnetic flux between the adjacent magnetic poles. As a result, the inter-pole thin portion 39 according to the third embodiment serves as the portion having the high magnetic resistance, which is unusable as the magnetic path.

In the third embodiment configured as described above, the following advantages can also be obtained in addition to the advantages in the above-mentioned second embodiment. That is, in the third embodiment, in the magnetic flux generated in the permanent magnet of the rotor, due to the relationship of $2\times(Ga)<(Gc)$, the leakage magnetic flux is hardly caused between the adjacent teeth, and the magnetic flux easily flows into the stator from the magnetic pole center portion on the first arc on the rotor outer peripheral surface, at which the air gap becomes the narrowest, to thereby increase an amount of the effective magnetic flux that interlinks with the stator. Further, when the large current flows through the stator so that the armature magnetic flux flows into the rotor, due to the relationship of $(Gc)<2\times(Gb)$, the armature magnetic flux avoids flowing toward a rotor outer peripheral portion having a high magnetic resistance, and is easily short-circuited to the adjacent teeth having a low magnetic resistance. Accordingly, less demagnetization of the permanent magnet is enabled.

Further, ferrite magnets are used as the permanent magnets, and the centers of the third arc and the fourth arc are set to coincide with an orientation center of the permanent magnet. In this case, an inner peripheral surface and an outer peripheral surface of the ferrite magnet are formed into a certain concentric circular arc-shape, and the thickness of the ferrite magnet in a radial direction of the curvature is uniformly maintained at about 6 mm. A magnet to which an orientation magnetic field is applied from a center of the concentric circular arcs is used, and the magnet is inserted into the magnet insertion hole having a shape conforming to the magnet and satisfying the above-mentioned relationship.

With this, the magnetic flux of the permanent magnet is generated in a direction perpendicular to the third arc and the fourth arc, and hence the magnetic flux of the permanent magnet is uniformly generated in a core portion corresponding to the magnetic pole surface without causing local concentration of the magnetic flux. Thus, the magnetic flux of the permanent magnet effectively interlinks with the stator. Further, the magnetic flux is uniformly generated in the magnetic pole surface, and hence the magnetic flux easily flows in accordance with the magnetic resistance of the first arc on the rotor outer peripheral surface. Further, the magnetic flux density distribution on the magnetic pole surface corresponds to a distribution similar to the sine wave that is maximized at the magnetic pole center. Thus, the harmonic component of the magnetic flux density can be reduced. Further, in general, a rare-earth magnet is manufactured by processing a block-shaped magnet, and hence is appropriate for a plate-like magnet. On the other hand, the ferrite magnet is manufactured by individual forming, and hence has an advantage in easiness in experimental manufacture even in an arc magnet shape as in the shape in this embodiment. Further, the ferrite magnet has a residual magnetic flux density of about ⅓ of that of the rare-earth magnet, thereby more remarkably exhibiting the effect of increasing the amount of the magnetic flux that interlinks with the stator as in the shape in this embodiment.

Note that, the third embodiment may be carried out in combination with the above-mentioned first embodiment not having the features of the above-mentioned second embodiment.

Fourth Embodiment

Figure 5:
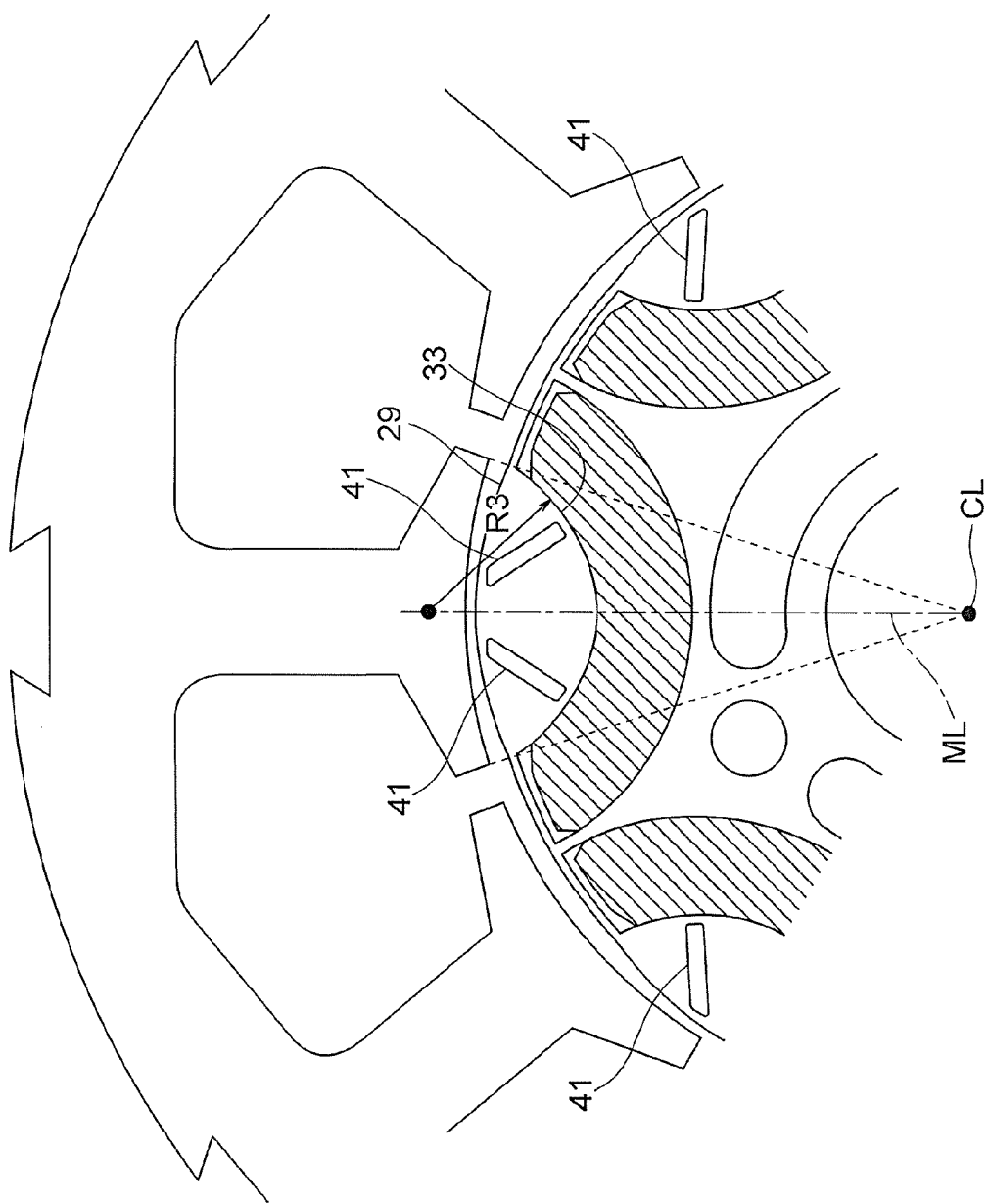
FIG. 5 is a view according to a fourth embodiment of the present invention in the same manner as that of FIG. 2.

Next, a fourth embodiment of the present invention is described referring to FIG. 5. FIG. 5 is a view according to the fourth embodiment of the present invention in the same manner as that of FIG. 5. Note that, the fourth embodiment has the same configuration as that of the above-mentioned third embodiment except for portions described below.

In an interior permanent magnet motor in the fourth embodiment, a pair of slits (air gaps) 41 are formed in a region in the rotor core 11 between each of the third arcs 33 of the magnet insertion holes 21 and the corresponding first arc 29 on the rotor outer peripheral surface 25. Each of the slits 41 is formed to extend along an extending direction of the radius R3 of the third arc 33, which passes through a formation position thereof in accordance with the formation position. All the slits 41 are air gaps each having a constant width of about 1 mm. In FIG. 5, the pair of slits 41 are arranged and formed to be line symmetrical with respect to the inter-pole center line ML as a center line. However, the fourth embodiment may be carried out in a mode in which two or more slits are formed on one side and a total of two or more pairs of slits are formed as long as the above-mentioned line symmetry is satisfied.

According to the fourth embodiment configured as described above, the following advantages can also be obtained in addition to the advantages in the above-mentioned third embodiment. That is, in the fourth embodiment, the flow of the magnetic flux generated in the permanent magnet is controlled by the slits without being blocked. Thus, the magnetic flux density distribution on the rotor surface can approach the sine wave, and further, the vibration and noise, which are caused due to an electromagnetic force by the armature magnetic flux generated in the stator, can be suppressed. Further, in the interior permanent magnet motor according to the fourth embodiment, the rotor having the slits as described above is used, and when variable speed drive is performed through PWM control by an inverter of a drive circuit, a highly efficient operation in accordance with requested product load conditions can be performed.

Note that, the fourth embodiment may be carried out in combination with the above-mentioned first or second embodiment not having the features of the above-mentioned third embodiment.

Fifth Embodiment

Next, as a fifth embodiment of the present invention, there is described a cylinder rotary compressor having the interior permanent magnet motor according to any one of the above-mentioned first to fourth embodiments mounted therein. Note that, the present invention encompasses a compressor having the interior permanent magnet motor according to any one of the above-mentioned first to fourth embodiments mounted therein. However, the type of the compressor is not limited to the rotary compressor.

Figure 6:
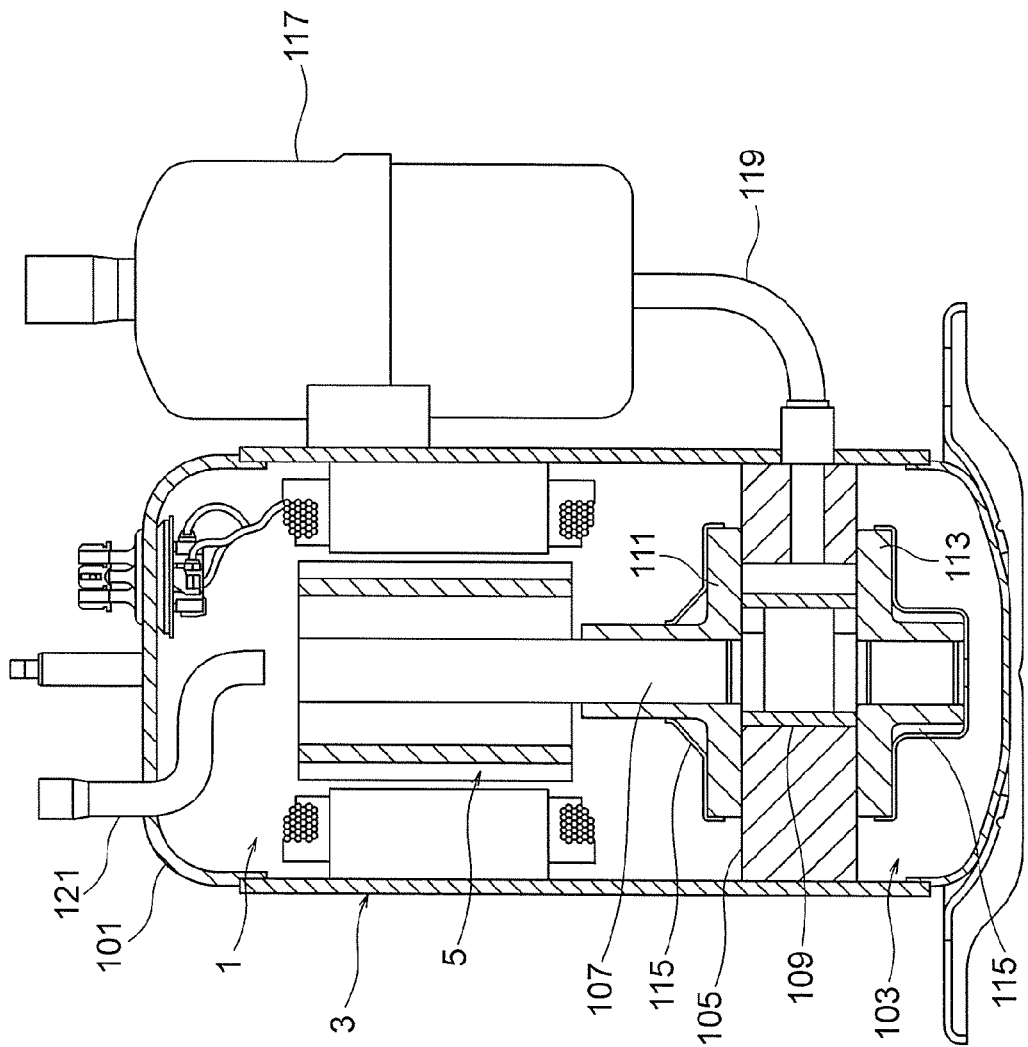
FIG. 6 is a vertical sectional view of a cylinder rotary compressor having the interior permanent magnet motor mounted therein according to a fifth embodiment of the present invention.

FIG. 6 is a vertical sectional view of the cylinder rotary compressor having the interior permanent magnet motor mounted therein. A cylinder rotary compressor 100 includes the interior permanent magnet motor 1 (motor element) and a compression element 103 in an airtight container 101. Although not illustrated, a refrigerant oil for lubricating each of sliding portions of the compression element 103 is stored in a bottom portion of the airtight container 101.

The compression element 103 includes, as main components thereof, a cylinder 105 arranged in a vertically stacked state, a rotary shaft 107 serving as a shaft rotated by the interior permanent magnet motor 1, a piston 109 to be fitted by insertion into the rotary shaft 107, a vane (not shown) dividing an inside of the cylinder 105 into an intake side and a compression side, an upper frame 111 and a lower frame 113 being a pair of upper and lower frames into which the rotary shaft 107 is to be rotatably fitted by insertion, for closing axial end surfaces of the cylinder 105, and mufflers 115 mounted on the upper frame 111 and the lower frame 113, respectively.

The stator 3 of the interior permanent magnet motor 1 is directly fixed to the airtight container 101 by a method such as shrink fitting or welding and is held thereby. The coil of the stator 3 is supplied with power from a glass terminal fixed to the airtight container 101.

The rotor 5 is arranged through intermediation of an air gap on the radially inner side of the stator 3, and is held in a rotatable state by the bearing portions (upper frame 111 and lower frame 113) of the compression element 103 via the rotary shaft 107 (shaft 13) in the center portion of the rotor 5.

Next, an operation of the cylinder rotary compressor 100 is described. A refrigerant gas supplied from an accumulator 117 is taken into the cylinder 105 through an intake pipe 119 fixed to the airtight container 101. The interior permanent magnet motor 1 is rotated by energization of an inverter so that the piston 109 fitted to the rotary shaft 107 is rotated in the cylinder 105. With this, the coolant is compressed in the cylinder 105. The coolant, which has passed through the muffler 115, rises in the airtight container 101. At this time, the refrigerant oil is mixed into the compressed coolant. When the mixture of the coolant and the refrigerant oil passes through the air holes 23 formed in the rotor core 11, the coolant and the refrigerant oil are promoted to be separated from each other, and hence the refrigerant oil can be prevented from flowing into a discharge pipe 121. In this manner, the compressed coolant is supplied on a high-pressure side of the refrigeration cycle through the discharge pipe 121 arranged on the airtight container 101.

Note that, as the coolant for the cylinder rotary compressor 100, R410A, R407C, R22, or the like that has hitherto been used may be used, but any coolant such as a coolant having a low global warming potential (GWP) can also be applied. In view of the prevention of global warming, a low GWP coolant is desirable. As typical examples of the low GWP coolant, the following coolants are given.

(1) A halogenated hydrocarbon having a carbon double bond in the composition; for example, HFO-1234yf (CF3CF=CH2) is given. An HFO is an abbreviation of a Hydro-Fluoro-Olefin, and an Olefin is an unsaturated hydrocarbon having one double bond. Note that, a GWP of HFO-1234yf is four.

(2) A hydrocarbon having a carbon double bond in the composition; for example, R1270 (propylene) is given. Note that, R1270 has a GWP of three, which is smaller than that of HFO-1234yf, but has higher combustibility than HFO-1234yf.

(3) A mixture containing at least any one of a halogenated hydrocarbon having a carbon double bond in the composition or a hydrocarbon having a carbon double bond in the composition; for example, a mixture of HFO-1234yf and R32 is given. HFO-1234yf, which is a low pressure coolant, is large in pressure loss and is thus liable to degrade the performance of the refrigeration cycle (in particular, in an evaporator). Therefore, a mixture of HFO-1234yf and R32 or R41 that is a coolant higher in pressure than HFO-1234yf is positively used in practical.

Also in the cylinder rotary compressor according to the fifth embodiment, which is configured as described above, with the use of the above-mentioned interior permanent magnet motor, a magnet torque of the interior permanent magnet motor can be improved to reduce the current supplied to the stator so that a copper loss and an inverter loss can be reduced, to thereby construct a highly efficient motor. Further, the harmonic component of the magnetic flux density can be reduced to reduce the noise and vibration, to thereby construct a motor that is less demagnetized even when a large current flows therethrough. Further, with the use of the interior permanent magnet motor in a compressor or a refrigeration and air conditioning apparatus, a highly efficient, low noise, and highly reliable product can be manufactured.

Figure 7:
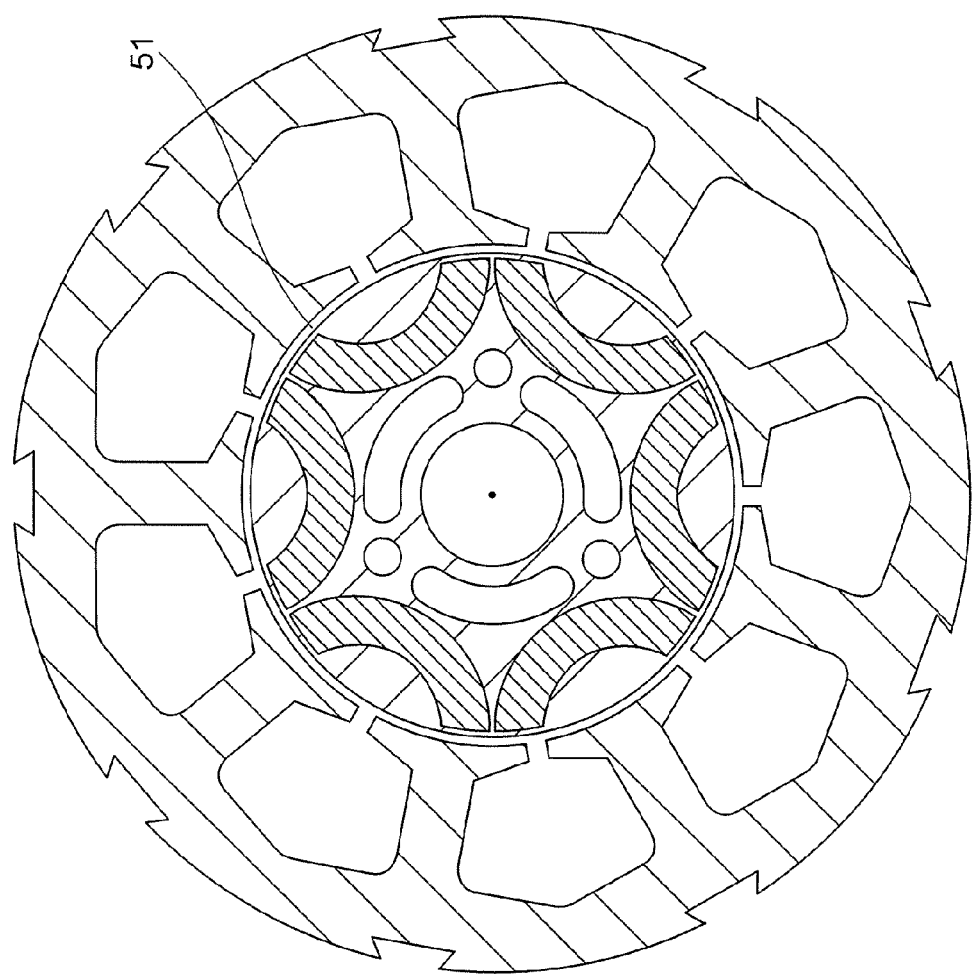
FIG. 7 is a view according to a comparative example in the same manner as that of FIG. 1.

Next, description is made of a result of comparison of inducted voltages between the present invention (including at least the features in the first embodiment) and a comparative example. FIG. 7 is a view according to the comparative example in the same manner as that of FIG. 1. As illustrated in FIG. 7, the comparative example corresponds to a motor having an air gap 51 constant over an entire circumference thereof.

Figure 8:
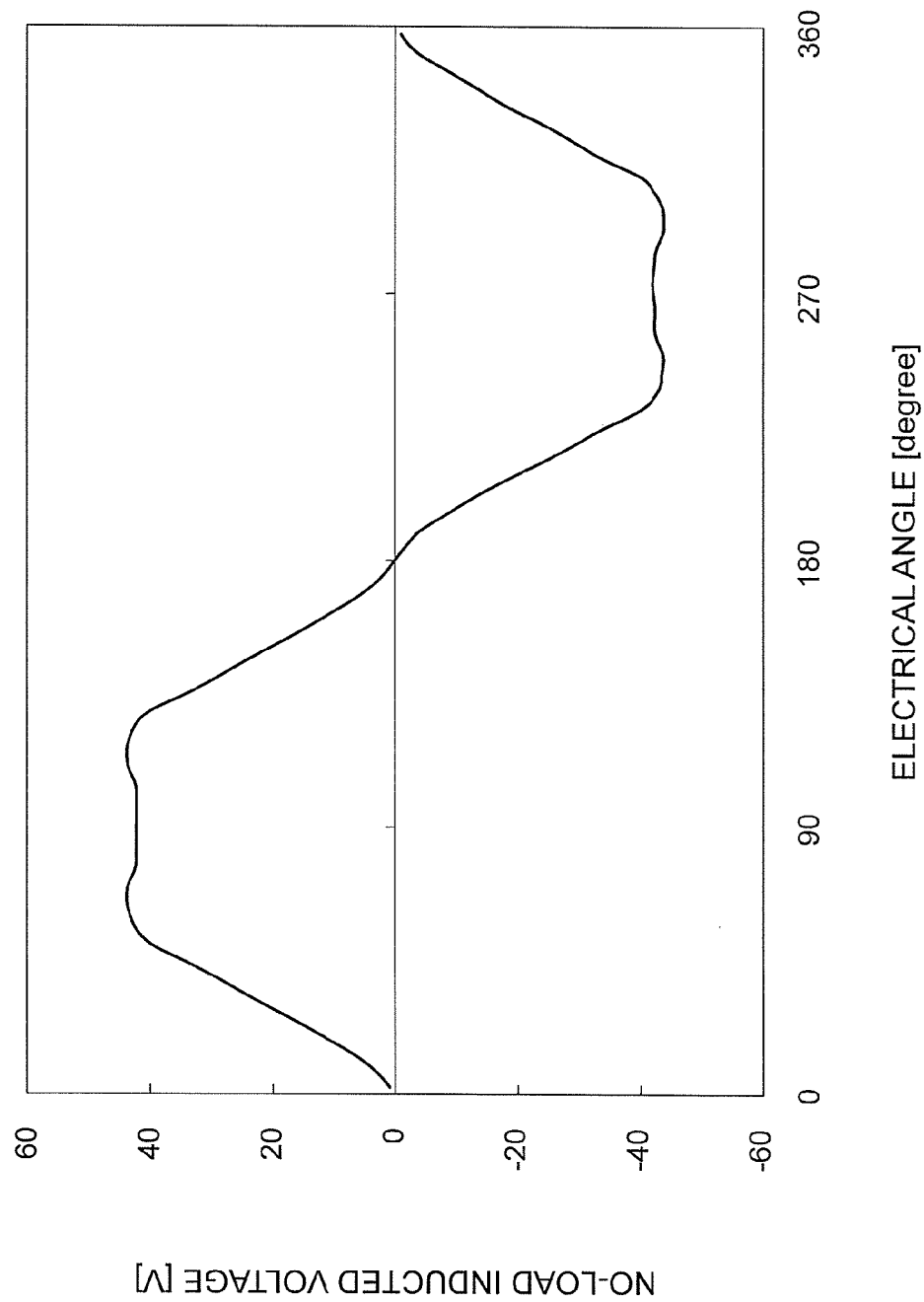
FIG. 8 is a graph for showing a relationship between an electrical angle and a no-load inducted voltage according to the comparative example.
Figure 9:
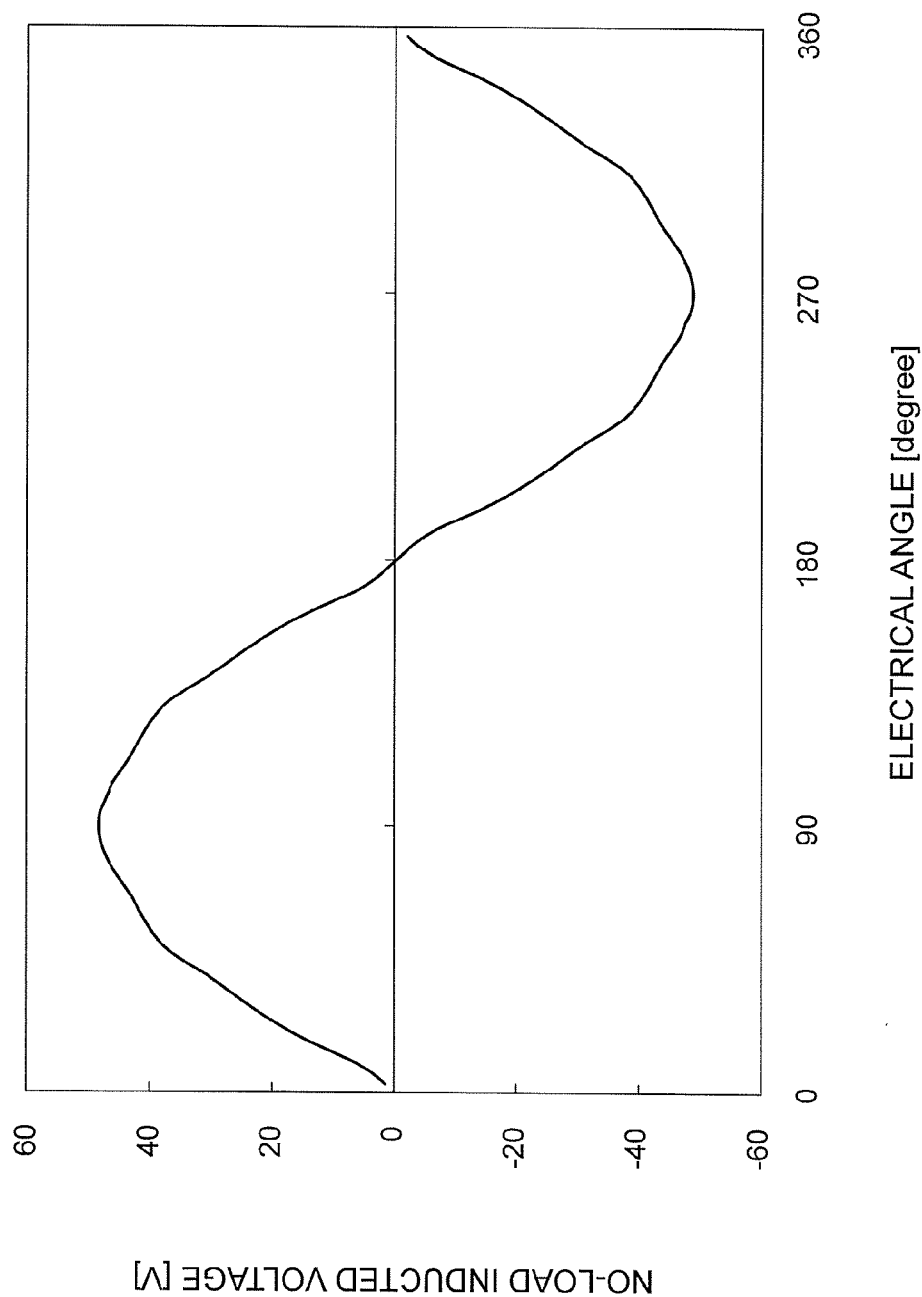
FIG. 9 is a graph for showing a relationship between an electrical angle and a no-load inducted voltage according to the present invention.

FIG. 8 is a graph for showing a relationship between an electrical angle [degree] and a no-load inducted voltage [V] during rotation at 1,000 rpm according to the comparative example. FIG. 9 is a graph for showing a relationship between an electrical angle [degree] and a no-load inducted voltage [V] during rotation at 1,000 rpm according to the present invention.

The inducted voltage corresponds to a voltage generated when the magnetic flux of the permanent magnet, which has flowed out of the rotor, interlinks with the coil wound around the tooth. The harmonic component is generated due to the magnetic flux density distribution on the rotor surface. As understood from the comparison between FIG. 8 and FIG. 9, a waveform of the no-load inducted voltage in the present invention in FIG. 9 is similar to the sine wave as compared to the comparative example in FIG. 8. The contained harmonic component is also reduced from 9% in the comparative example to 2% in the present invention. A torque of the motor is generated in accordance with a product of an inducted voltage level and a current. Thus, the motor according to the present invention is capable of attaining drive with a small torque ripple and low noise.

Further, FIG. 10 is a graph for comparing root mean square values of the inducted voltages between the comparative example and the present invention. As shown in FIG. 10, the root mean square value of the inducted voltage in the present invention is improved by 13% as compared to that in the comparative example. With this, a current value when the same torque is generated is reduced in proportion to the root mean square value, and hence the copper loss and the inverter loss can be reduced to attain highly efficient drive.

Further, FIG. 11 is a graph for comparing demagnetizing factors between the comparative example and the present invention when the stator is energized so that an armature magnetic flux in a phase opposite to the permanent magnet of the rotor is generated.

The demagnetizing factor represents a ratio of amounts of the magnetic flux on the rotor surface before and after the energization. When the permanent magnet is demagnetized, the performance of the motor is varied. Thus, in order to ensure the reliability of the motor, for example, an overcurrent protection breaker is provided in a circuit, for preventing a flow of a current leading to a demagnetizing factor of 3% or more. In a motor that is demagnetized with a small current, a breaking current is small, and hence the motor cannot be operated in a high-load region. Under such a background, in FIG. 11, comparing values of currents leading to the demagnetizing factor of 3% between the comparative example and the present invention, the value is larger in the present invention by approximately 30%. Accordingly, it is understood that the resistance to demagnetization is significantly improved in the present invention as compared to the comparative example. Therefore, according to the present invention, it is possible to construct a highly reliable motor that is not demagnetized even in the high-load region.

Sixth Embodiment

Further, the present invention may be carried out as a refrigeration and air conditioning apparatus including the compressor according to the above-mentioned fifth embodiment as a component of a refrigeration cycle. Note that, configurations of components other than the compressor of the refrigeration cycle of the refrigeration and air conditioning apparatus are not particularly limited.

In the above, the details of the present invention are specifically described referring to the preferred embodiments. However, it is apparent to those skilled in the art that various modifications may be made based on the basic technical concept and the teachings of the present invention.

REFERENCE SIGNS LIST 1 interior permanent magnet motor, 3 stator, 5 rotor, 7 tooth portion, 7a tooth tip portion, 11 rotor core, 15 air gap, 19 permanent magnet, 19a side surface portion, 21 magnet insertion hole, 25 rotor outer peripheral surface, 27 stator inner peripheral surface, 29 first arc, 29a magnetic pole center portion, 31 second arc, 33 third arc, 35 fourth arc, 37 magnet-side surface opposing portion, 39 inter-pole thin portion, 41 slit, 100 cylinder rotary compressor, 101 airtight container, 103 compression element

The invention claimed is:
1. An interior permanent magnet motor, comprising:
a stator; and
a rotor rotatably arranged so as to be opposed to the stator,
wherein the rotor comprises a rotor core having a plurality of magnet insertion holes formed therein, into which corresponding permanent magnets are respectively inserted,
wherein an air gap is secured between a rotor outer peripheral surface of the rotor and a stator inner peripheral surface of the stator,
wherein the stator comprises a plurality of tooth portions,
wherein a tooth tip portion having both side portions expanding in a circumferential direction is formed on a distal end portion of each of the tooth portions,
wherein the rotor outer peripheral surface comprises, when viewed in a cross-section orthogonal to a rotation center line:
a plurality of first arcs; and
a plurality of second arcs,
wherein each of the first arcs is positioned in a corresponding magnetic pole center portion on the rotor outer peripheral surface,
wherein each of the second arcs is positioned in a corresponding inter-pole portion on the rotor outer peripheral surface,
wherein the first arc bulges toward a radially outer side to a higher degree than the second arc so that the air gap is varied in a manner of being increased as approaching from each of the magnetic pole center portions to the adjacent inter-pole portions,
wherein, when viewed in the cross-section orthogonal to the rotation center line, a hole defining portion of each of the magnet insertion holes of the rotor core on the radially outer side has a curvature of a third arc, and a hole defining portion of the each of the magnet inser- tion holes of the rotor core on a radially inner side has a curvature of a fourth arc, and wherein an opening angle of the tooth tip portion, an opening angle of the first arc, and an opening angle of the third arc coincide with each other.

2. An interior permanent magnet motor according to claim 1, wherein a center of a radius of the first arc is set to a position displaced toward a magnetic pole side from the rotation center line, and wherein a center of a radius of the third arc is set in the tooth tip portion.

3. An interior permanent magnet motor according to claim 1, wherein an opening angle between the tooth tip portions of a pair of the tooth portions, which are located on both sides of the each of the tooth portions, is smaller than an opening angle of the fourth arc.

4. An interior permanent magnet motor according to any one of claim 1, wherein an inter-pole thin portion having a uniform thickness is secured between a magnet-side surface opposing portion of the magnet insertion hole, which receives a side surface portion of the permanent magnet, and the second arc, and wherein, assuming that a narrowest interval of the air gap between the magnetic pole center portion on the first arc on the rotor outer peripheral surface and the stator inner peripheral surface of the tooth tip portion is defined as Ga, a dimension obtained by further adding the thickness of the inter-pole thin portion to a widest interval of the air gap between the second arc on the rotor outer peripheral surface and the stator inner peripheral surface of the tooth tip portion is defined as Gb, and an interval of the adjacent tooth tip portions is defined as Gc, a magnitude relationship of $2\times(Ga) < (Gc) < 2\times(Gb)$ is satisfied.

5. An interior permanent magnet motor according to claim 1, wherein a pair of slits are formed in a region between each of the third arcs and the corresponding first arc, wherein each of the slits extends along an extending direction of the radius of the third arc, and wherein the pair of slits are formed to be line symmetrical with respect to an inter-pole center line as a center line.

6. A compressor, comprising, in an airtight container:

a motor; and a compression element, wherein the motor comprises the interior permanent magnet motor of claim 1.

7. A refrigeration and air conditioning apparatus, comprising the compressor of claim 6 as a component of a refrigeration cycle.

* * * * *